(12) United States Patent
Hying et al.

(10) Patent No.: US 12,397,267 B2
(45) Date of Patent: Aug. 26, 2025

(54) COMPOSITE BODY AND USE THEREOF IN ORGANOPHILIC NANOFILTRATION

(71) Applicant: EVONIK OPERATIONS GMBH, Essen (DE)

(72) Inventors: Christian Hying, Rhede (DE); Oliver Conradi, Düsseldorf (DE); Dirk Poppe, Gelsenkirchen (DE); David Grzenia, Recklinghausen (DE); Kira Khaletskaya, Neuburg an der Donau (DE)

(73) Assignee: EVONIK OPERATIONS GMBH, Essen (DE)

( * ) Notice: Subject to any disclaimer, the term of this patent is extended or adjusted under 35 U.S.C. 154(b) by 516 days.

(21) Appl. No.: 17/792,309

(22) PCT Filed: Jan. 6, 2021

(86) PCT No.: PCT/EP2021/050126
§ 371 (c)(1),
(2) Date: Jul. 12, 2022

(87) PCT Pub. No.: WO2021/144176
PCT Pub. Date: Jul. 22, 2021

(65) Prior Publication Data
US 2023/0072241 A1     Mar. 9, 2023

(30) Foreign Application Priority Data
Jan. 17, 2020 (EP) .................................... 20152436

(51) Int. Cl.
*B01D 69/14*     (2006.01)
*B01D 61/02*     (2006.01)
(Continued)

(52) U.S. Cl.
CPC ......... *B01D 69/148* (2013.01); *B01D 61/027* (2013.01); *B01D 63/10* (2013.01);
(Continued)

(58) Field of Classification Search
CPC .... B01D 69/148; B01D 61/027; B01D 63/10; B01D 67/0041; B01D 67/00793;
(Continued)

(56) References Cited

U.S. PATENT DOCUMENTS

| 4,297,145 A | 10/1981 | Wolff et al. |
| 5,885,657 A | 3/1999 | Penth |

(Continued)

FOREIGN PATENT DOCUMENTS

| CA | 2680667 A1 | 9/2008 |
| CN | 103951728 A | 7/2014 |

(Continued)

OTHER PUBLICATIONS

International Search report PCT/EP2022/065000 dated Sep. 8, 2022 (pp. 1-48).

(Continued)

*Primary Examiner* — Madeline Gonzalez
(74) *Attorney, Agent, or Firm* — Millen, White, Zelano & Branigan; Ryan R. Pool

(57) ABSTRACT

A composite body comprising a porous layer (1) made from oxide particles connected to one another and partially to a substrate, containing at least one oxide of the elements Al, Zr, Ti or Si, and comprising a further porous layer (2) at least on one side, having oxide particles connected to one another and partially to the layer (1) and containing at least one oxide of the elements Al, Zr, Ti or Si, wherein the oxide particles in the layer (1) have a greater average particle size ($d_{50}$ is 0.5 to 4 μm) than the oxide particles in the layer (2) ($d_{50}$ is 0.015 to 0.15 μm), characterised in that a polymer (Continued)

coating (PB) is provided on or above the layer (2), containing one or more polysiloxanes. A method for producing corresponding composite bodies and to the use thereof.

12 Claims, 2 Drawing Sheets

(51) Int. Cl.
  *B01D 63/10* (2006.01)
  *B01D 67/00* (2006.01)
  *B01D 69/02* (2006.01)
  *B01D 69/10* (2006.01)
  *B01D 69/12* (2006.01)
  *B01D 71/02* (2006.01)
  *B01D 71/70* (2006.01)

(52) U.S. Cl.
  CPC ... *B01D 67/0041* (2013.01); *B01D 67/00793* (2022.08); *B01D 69/02* (2013.01); *B01D 69/1071* (2022.08); *B01D 69/12* (2013.01); *B01D 71/024* (2013.01); *B01D 71/025* (2013.01); *B01D 71/027* (2013.01); *B01D 71/70* (2013.01); *B01D 2325/02833* (2022.08); *B01D 2325/02834* (2022.08); *B01D 2325/04* (2013.01); *B01D 2325/06* (2013.01); *B01D 2325/20* (2013.01); *B01D 2325/28* (2013.01)

(58) Field of Classification Search
  CPC .... B01D 69/02; B01D 69/1071; B01D 69/12; B01D 71/024; B01D 71/025; B01D 71/027; B01D 71/70; B01D 2325/02833; B01D 2325/02834; B01D 2325/04; B01D 2325/06; B01D 2325/20; B01D 2325/28; B01D 67/00413; B01D 69/1218; B01D 2325/30; B01D 67/0046; Y02E 60/10
  USPC ...... 210/654, 650, 488–492, 500.21, 500.23, 210/505–509, 439
  See application file for complete search history.

(56) References Cited

U.S. PATENT DOCUMENTS

| | | |
|---|---|---|
| 5,928,518 A | 7/1999 | Schafer-Treffenfeldt et al. |
| 6,299,668 B1 | 10/2001 | Penth et al. |
| 6,299,778 B1 | 10/2001 | Penth et al. |
| 6,309,545 B1 | 10/2001 | Penth et al. |
| 6,340,379 B1 | 1/2002 | Penth et al. |
| 6,383,386 B1 | 5/2002 | Hying et al. |
| 6,472,571 B1 | 10/2002 | Karau et al. |
| 6,586,638 B1 | 7/2003 | Zhang et al. |
| 6,841,075 B2 | 1/2005 | Penth et al. |
| 7,246,761 B2 | 7/2007 | Hoppe et al. |
| 7,709,140 B2 | 5/2010 | Hennige et al. |
| 7,959,011 B2 | 6/2011 | Hennige et al. |
| 8,039,110 B2 | 10/2011 | Jenkner et al. |
| 8,105,656 B2 | 1/2012 | Nun et al. |
| 8,138,952 B2 | 3/2012 | Reinhard et al. |
| 8,142,920 B2 | 3/2012 | Hennige et al. |
| 8,163,351 B2 | 4/2012 | Nun et al. |
| 8,337,974 B2 | 12/2012 | Hennige et al. |
| 8,349,911 B2 | 1/2013 | Kuehnle |
| 8,597,819 B2 | 12/2013 | Hennige et al. |
| 8,633,291 B2 | 1/2014 | Ebbrecht et al. |
| 8,652,291 B2 | 2/2014 | Nun et al. |
| 8,889,812 B2 | 11/2014 | Albert et al. |
| 9,096,041 B2 | 8/2015 | Nun et al. |
| 9,180,487 B2 | 11/2015 | Weinelt et al. |
| 9,243,130 B2 | 1/2016 | Langerbeins et al. |
| 9,539,549 B2 | 1/2017 | Haensel et al. |
| 9,610,547 B2 | 4/2017 | Ding et al. |
| 10,044,015 B2 | 8/2018 | Hying et al. |
| 10,202,562 B2 | 2/2019 | Boam et al. |
| 10,532,320 B2 | 1/2020 | Boam et al. |
| 10,934,501 B2 | 3/2021 | Boam et al. |
| 2002/0155611 A1 | 10/2002 | Vernhes et al. |
| 2004/0097715 A1 | 5/2004 | Teissie et al. |
| 2005/0070193 A1* | 3/2005 | Hennige ........... H01M 50/4295 427/430.1 |
| 2005/0087491 A1 | 4/2005 | Hennige et al. |
| 2005/0172811 A1* | 8/2005 | Oyama ............ B01D 67/0072 96/4 |
| 2006/0078791 A1 | 4/2006 | Hennige et al. |
| 2008/0190841 A1 | 8/2008 | Pascaly et al. |
| 2009/0110873 A1 | 4/2009 | Jiang et al. |
| 2010/0210445 A1 | 8/2010 | Von Rymon Lipinski et al. |
| 2012/0068110 A1 | 3/2012 | Schubert et al. |
| 2012/0279922 A1 | 11/2012 | Haensel et al. |
| 2012/0308871 A1 | 12/2012 | Pascaly et al. |
| 2013/0118355 A1 | 5/2013 | Clinton et al. |
| 2013/0249440 A1 | 9/2013 | Doshi et al. |
| 2013/0267403 A1 | 10/2013 | Von Rymon Lipinski et al. |
| 2014/0069293 A1 | 3/2014 | Albert et al. |
| 2014/0127546 A1 | 5/2014 | Pascaly et al. |
| 2014/0131928 A1 | 5/2014 | Ebbrecht et al. |
| 2014/0326809 A1 | 11/2014 | Müller et al. |
| 2015/0017512 A1 | 1/2015 | Terwonne et al. |
| 2015/0029681 A1 | 1/2015 | Mack et al. |
| 2017/0348641 A1 | 12/2017 | Rodrigues et al. |
| 2018/0163167 A1 | 6/2018 | Minamitani et al. |
| 2020/0197877 A1 | 6/2020 | Hying et al. |
| 2020/0350546 A1* | 11/2020 | Sung ................... H01M 50/489 |
| 2021/0197134 A1 | 7/2021 | Krause et al. |
| 2021/0363463 A1 | 11/2021 | Xie et al. |

FOREIGN PATENT DOCUMENTS

| | | |
|---|---|---|
| DE | 19838800 C1 | 3/2000 |
| DE | 10139559 A1 | 2/2003 |
| DE | 10208278 A1 | 9/2003 |
| DE | 10254732 A1 | 6/2004 |
| DE | 19811708 B4 | 9/2008 |
| DE | 102007058712 A1 | 6/2009 |
| DE | 10255121 B4 | 9/2017 |
| DE | 202022000423 U1 | 3/2022 |
| DE | 202022000424 U1 | 7/2022 |
| EP | 1925047 B1 | 7/2015 |
| EP | 3669974 A1 | 6/2020 |
| JP | 2005-518272 A | 6/2005 |
| JP | 2005-525224 A | 8/2005 |
| JP | 2006-507635 A | 3/2006 |
| JP | 2008-208511 A | 9/2008 |
| JP | 2013-512100 A | 4/2013 |
| JP | 2018-505771 A | 3/2018 |
| JP | 2019-503852 A | 2/2019 |
| JP | 2021045071 A | 3/2021 |
| WO | 2002038258 A1 | 5/2002 |
| WO | 2002038259 A1 | 5/2002 |
| WO | 2002038260 A1 | 5/2002 |
| WO | 2002080296 A2 | 10/2002 |
| WO | 2002080297 A2 | 10/2002 |
| WO | 2003013708 A2 | 2/2003 |
| WO | 2003069708 A2 | 8/2003 |
| WO | 2003069711 A2 | 8/2003 |
| WO | 2003069712 A2 | 8/2003 |
| WO | 2003072233 A1 | 9/2003 |
| WO | 2003073543 A2 | 9/2003 |
| WO | 2003073545 A2 | 9/2003 |
| WO | 2007149640 A2 | 12/2007 |
| WO | 2011067054 A1 | 6/2011 |
| WO | 2016194782 A1 | 12/2016 |
| WO | 2017207346 A1 | 12/2017 |
| WO | 2018024778 A1 | 2/2018 |

OTHER PUBLICATIONS

Search report in corresponding EP 21178954.0 dated 08.12.2021 (pp. 1-68).

(56) References Cited

OTHER PUBLICATIONS

Muharram Mmabdel-Kader MS: "Utilization of gel electrophoreses for the quantitative estimation of digestive enzyme papain", Saudi Pharm J., vol. 25, No. 3, 2017, pp. 359-364, XP029945120, DOI: 10.1016/j.jsps.2016.09.002.

Zwijnenberg H J et al: "Important factors influencing molecular weight cut-off determination of membranes in organic solvents", Journal of Membrane Science, Elsevier BV, NL, vol. 390, Nov. 21, 2011 (Nov. 21, 2011), pp. 211-217, XP028356856, ISSN: 0376-7388, [retrieved on Nov. 30, 2011], DOI: 10.1016/J.MEMSCI.2011.11.039.

International Search Report PCT/EP2021/050126 dated 2021 (pp. 1-5).

\* cited by examiner

COMPOSITE BODY AND USE THEREOF IN ORGANOPHILIC NANOFILTRATION

The present invention relates to a composite body having, on a porous substrate and in the interstices of the substrate that includes fibres, preferably of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, where the oxide particles present in layer (1) have a greater median particle size than the oxide particles present in layer (2), where the median particle size ($d_{50}$) of the oxide particles in layer (1) is from 0.5 to 4 μm and the median particle size ($d_{50}$) of the oxide particles in layer (2) is from 0.015 to 0.15 μm, preferably 0.04 to 0.06 μm, which is characterized in that a polymer coating (PB) containing one or more polysiloxanes is present atop or above layer (2), to a process for producing corresponding composite bodies and to the use thereof, especially in organophilic nanofiltration.

Membranes have been used for some time for separation of organic solutions. This involves separating dissolved impurities, catalysts or materials of value having a higher molecular weight than the solvent from said solvent.

Owing to the maximum flow rate of only 50 to 150 L/m² h at about 30 bar ($30*10^5$ Pa) (toluene flow rate, determined as specified in the examples), the applications of the membranes usable to date are highly limited. A distinct increase in this flow rate would lead to very much broader use of the technique, since applications in the petrochemical industry would also be directly possible.

Increasing the flow rate would readily be achievable by the performance of the nanofiltration at higher temperatures, for example in the range from 120 to 200° C. However, there are currently no available membrane materials that show sufficiently high thermal stability at acceptable production cost.

For example, known silicone-coated PAN membranes for nanofiltration from Evonik Resource Efficiency GmbH include the trade names PURAMEM® SELECTIVE, PURAMEM® PERFORMANCE and PURAMEM® FLUX, the application window of which is 20 to 40 bar (20 to $40*10^5$ Pa) and a maximum temperature of 50° C.

There have been various unsuccessful attempts to date to manufacture the membranes from thermally stable polymers. This was usually because the porous support structure present was compressed at elevated pressure and elevated temperature and hence did not permit any further flow through the membrane, or failed in the worst case when there was a fracture or crack in the membrane.

There are known membranes having fluoropolymer coatings from the field of gas separation. In WO 2007/149640 A2, the company Porogen proposed applying a fluoropolymer layer atop a porous PEEK carrier (PEEK film). A challenge here was the binding of the fluoropolymers via functional groups to the carrier.

DE 198 38 800 proposes an electrical separator with the composite structure that comprises a two-dimensional, flexible substrate provided with a multitude of orifices and having a coating present thereon. The material of the substrate is selected from metals, alloys, plastics, glass and carbon fibres or a combination of such materials, and the coating is a two-dimensionally continuous, porous, electrically nonconductive ceramic coating. The use of the ceramic coating promises thermal and chemical stability.

The fact that such composite bodies can be modified with polymers is described, for example, by EP 1925047 A1. However, the polymers used therein are to have essentially spherical structures and to be within the composite body.

Professor James Economy's group published a report about a research project for production of thin film composite (TFC) membranes, in which a selected layer is applied to a porous support, for example a polysulfone or ceramic membrane (http://economy.matse.illinois.edu/membrane.htm).

DE 10139559 A1 describes hybrid membranes in which ceramic materials are modified with organic separation layers. These are said to have better long-term stability than membranes with carriers made of polymers, but have an uneven polymer surface. DE 10208278 A1 describes similar hybrid membranes in which, however, the ceramic membranes are based on a polymeric carrier material, especially polymer nonwoven.

Multilayer, essentially ceramic composite materials are also already known from DE 10255121 A1. The composite materials described therein are used as battery separators.

The as yet unpublished application EP 19217879.6 describes composite bodies that are used as gas separation membranes and have a layer based on fluorine-containing polymers as separation-active polymer layer.

The problem addressed by the present invention was that of providing a membrane material not having one or more of the disadvantages of the membrane materials known from the prior art.

It has now been found that, surprisingly, by application of a polymer coating comprising polysiloxane to a composite body that has a very smooth surface, it is possible to obtain membranes that solve this problem.

The present invention therefore provides composite bodies, a process for producing composite bodies and for the use of these composite bodies as claimed in the claims and described in detail hereinafter.

The present invention more particularly provides a composite body having, on a porous substrate and in the interstices of the substrate that includes fibres, preferably of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, where the oxide particles present in layer (1) have a greater median particle size than the oxide particles present in layer (2), where the median particle size ($d_{50}$) of the oxide particles in layer (1) is from 0.5 to 4 μm and the median particle size ($d_{50}$) of the oxide particles in layer (2) is from 0.015 to 0.15 μm, preferably 0.04 to 0.06 μm, which is characterized in that a polymer coating (PB) containing one or more polysiloxanes is present atop or above layer (2), a process for producing corresponding composite bodies and for the use thereof, especially in organophilic nanofiltration, and a separating device containing a composite material according to the invention or a composite material prepared according to the invention.

The composite bodies of the invention have the advantage of having a very smooth surface with fine pores, such that it is possible to apply separation-active polymer layers or films that have a virtually uniform thickness at all points.

In addition, the composite body of the invention has the advantage that it can be, preferably is, sufficiently flexible that it can be processed further by the customary methods to give membrane modules, especially to give what are called spiral-wound modules. These membrane modules are the customary use form of membranes.

These are aggregates that are easy to handle, by means of which the membrane installed therein can be introduced, for example, into industrial plants.

What can be achieved by virtue of the uniform thickness is that the entire surface of the separation-active layer (polymer coating) has no defects, for example holes, and homogeneous permeability at the surface. This is detectable by point flow measurements with appropriate gases.

The (gas) flow rate through the membrane according to the invention may be greater than 200 GPU, preferably >500 GPU, for carbon dioxide. A flow rate of one GPU corresponds to 0.0027 m$^3$ (STP)/(m$^2$ h bar) (0.0027 10$^{-5}$ m$^3$ (STP)/(m$^2$ h Pa)).

The homogeneous permeability of the surface of the membrane avoids preferential flow through some regions of the membrane, and impairment of these regions particularly rapidly by extraneous substances that may be present in non-negligible concentrations, which would lead to a rapid drop in the separation performance in the corresponding subregions of the membrane.

The size of the oxide particles used achieves uniform impregnation of the substrate, which ensures that there are no resultant cavities and inclusions of air in the composite body. This ensures that the composite body does not become compacted under compressive stress and the pore structure of the composite body is not destroyed. Moreover, it is possible via the size of the oxide particles used to adjust the pore size of the composite body.

The use of the suitable combination of substrates including fibres, especially nonwoven substrates, in combination with the oxide particles can achieve a tensile strength of the composite body according to the invention of >40 N/m in machine direction.

The composite material according to the invention and the use thereof as membrane in organophilic nanofiltration even at elevated temperatures makes it possible to directly treat streams of matter that are obtained at elevated temperature in the respective production processes, such that it is possible to dispense with laborious cooling of the streams of matter to be treated prior to the organophilic nanofiltration.

The composite body of the invention, the process according to the invention for producing a composite body and the use according to the invention of the composite body are described by way of example hereinafter, without any intention that the invention be restricted to these illustrative embodiments. Where ranges, general formulae or classes of compounds are specified hereinbelow, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Where figures are given in percent hereinbelow, these are percentages by weight unless otherwise stated. Where averages, for example molar mass averages, are reported hereinbelow, these are the numerical average unless otherwise stated. Where properties of a material are referred to hereinafter, for example viscosities, gas flows, selectivities or the like, these are properties of the material at 25° C. unless stated otherwise. Where chemical (empirical) formulae are used in the present invention, the specified indices may be not only absolute numbers but also average values. The indices relating to polymeric compounds are preferably average values.

The composite body according to the invention having, on a porous substrate and in the interstices of the substrate that includes fibres of an electrically nonconductive material, a porous layer (1) composed of oxide particles bonded to one another and partly to the substrate that include at least one oxide selected from oxides of the elements Al, Zr, Ti and Si, preferably selected from $Al_2O_3$, $ZrO_2$, $TiO_2$ and $SiO_2$, more preferably selected from $Al_2O_3$ and $SiO_2$, and having, at least on one side, a further porous layer (2) including oxide particles bonded to one another and partly to layer (1) that include at least one oxide selected from oxides of the elements Al, Zr, Ti and Si, preferably selected from $Al_2O_3$, $ZrO_2$, $TiO_2$ and $SiO_2$, more preferably selected from $Al_2O_3$ and $SiO_2$, where the oxide particles present in layer (1) have a greater median particle size than the oxide particles present in layer (2), and the median particle size ($d_{50}$) of the oxide particles in layer (1) is from 0.5 to 4 prn and the median particle size ($d_{50}$) of the oxide particles in layer (2) is from 0.015 to 0.15 μm, preferably 0.04 to 0.06 μm, which is characterized in that a polymer coating (PB) containing one or more polysiloxane is present atop or above layer (2). What are meant by polysiloxanes in the context of the present invention is organically modified or unmodified polysiloxanes that are frequently also referred to as silicones. Preferred polysiloxanes or silicones are those as described in WO 2011/067054 A1.

The median particle size in the layers can be determined by taking scanning electron micrographs (for example with a JEOL JSM IT300 scanning electron microscope) and performing image evaluation. Alternatively, the particle size of the particles used, prior to the coating and consolidation in the dispersion, can also be determined by means of suitable instruments for particle size measurement (Mastersizer Hydro 2000S, Malvern Panalytical, Malvern, UK) by means of static light scattering, in accordance with ISO 13320. This instrument measures the size of particles with the aid of laser diffraction. For this purpose, the refractive index of the particles to be measured must be known and recorded in the software. For the measurement of the particle size distribution, the solid material to be measured is dispersed in demineralized water by means of stirring at 1750 rpm and, if required, with addition of ultrasound. A sufficiently large aliquot of the dispersed sample is pipetted into the dispersion module of the measuring instrument that the laser darkening is between 15% and 20%. The Mastersizer Hydro 2000S is used to measure the intensity of the light from two laser beams scattered by the sample (wavelength 633 nm and 466 nm). The three-dimensional distribution of the scattering intensities is evaluated by means of the Mie theory. This is used to ascertain the particle size and particle size distribution. The measurement results are also reported as a distribution curve; what is thus obtained is not just a statement as to the average particle size but also information as to the smallest and largest particles in the sample. The $d_{50}$ indicates the median particle size. $d_{50}$ in this connection refers to the diameter at which 50% of the volume-weighted size distribution is smaller than this diameter. Further parameters are accordingly the $d_{10}$ as a measure of the smallest particles in the sample, and $d_{90}$ as a measure of the larger particles. The closer $d_{10}$ and $d_{90}$ are together, the narrower the particle size distribution.

Particular preference is given to the oxide particles that include or consist of an oxide selected from $Al_2O_3$ and $SiO_2$. Very particularly preferred oxide particles having a median particle size ($d_{50}$) of 0.015 to 0.15 µm, preferably 0.04 to 0.06 µm, are those based on or consisting of $SiO_2$. Examples of particularly preferred oxide particles are pyrogenic oxide particles as supplied under the Aerosil® or Aeroxide® brand name by Evonik Resource Efficiency or comparable products from other suppliers.

The composite body according to the invention without the presence of the polymer coating preferably has a Gurley number of 200 to 1700 sec, preferably 250 to 1200 sec and more preferably of 300 to 800 sec. The Gurley number can be determined, for example, prior to application of the polymer coating.

The Gurley number is a measure of the air permeability of a porous material. It is defined as the time in seconds which is required for 100 cm³ of air to diffuse under defined conditions through one inch² of a sample. For the determination, a wad punch is used to punch out circular samples of diameter 44 mm. The sample to be examined is checked on a light stage for defects, possibly holes. Only visually impeccable samples are suitable for the measurement. Before commencement of the measurement, it should be checked that the level has been adjusted on the measuring instrument (Densometer model No. 4110N, Gurley Precision Instruments, Troy, NY) and the external cylinder has been filled up to the mark with densometer oil from Gurley Precision Instruments. The densometer testing operation involves measuring the time needed for a particular amount of air to flow through a particular sample area under a uniform gentle pressure. The compressed air is produced by an internal cylinder of exact diameter and with standard weight and flows freely into an external cylinder partly filled with oil, which serves to ensure airtightness.

The composite body according to the invention preferably has a thickness of 100 to 400 µm, preferably 125 to 200 µm and more preferably of 130 to 170 µm. The thickness is determined with a micrometer from Mitutoyo (Digimetic Micrometer MDC-25PX, 0-25 µm).

The composite body according to the invention preferably has an average pore size of 60 to 140, preferably 75 to 130 nm. The average pore size is determined by means of gas flow porometry as described hereinafter with a Porolux 1000 (Porometer, Eke, Belgium).

For this purpose, a circular sample of diameter 25 mm is punched out of the material to be analysed, dried in a drying cabinet at 100° C. for 1 hour in order to remove moisture from the pores, and then placed immediately in the Porefil wetting fluid, in order that all pores present are filled with this liquid. Subsequently, the sample is degassed in a desiccator by briefly applying reduced pressure (150 mbar or 15 kPa) in order to ensure that all pores are filled with Porefil. The degassed sample is placed into the sample holder of the measuring instrument and the sample holder is screwed together.

The determination of the pore radius distribution is based on the measurement principle of capillary flow porometry. The sample that has been wetted with the wetting liquid and degassed is subjected in the measurement cell to an inert gas pressure (nitrogen) that rises stepwise, and the pore diameter corresponding to the pressure applied is emptied by the gas pressure. At the same time, the flow rate of the gas at rising pressures is recorded. In the continuous pores, exchange of the wetting liquid with nitrogen takes place. This proceeds until the relevant pore range has been covered, i.e. until even the smallest pores present in the measurement region are freed of liquid. Subsequently, the pressure in the measurement cell is lowered again and the measurement is repeated on the now dry sample. The difference between the wet curve and the dry curve is used to calculate the pore size distribution. The porometry measurements lead to knowledge of the greatest pore radii present ("bubble point"), and of the most common and smallest pore diameters.

The composite body according to the invention has, on the surface of the layer (2), a surface roughness Sdq, determined as described hereinafter, of preferably less than 10 µm, more preferably of less than 8 µm.

Surface roughness is determined based on a measurement area of 2 cm*2 cm, measured by means of a confocal microscope (http://ak-rauheit.de/files/3D%Kennqr%F6%DFen.pdf). The determination can be effected, for example, with a µsurf expert confocal microscope from Nanofocus, Oberhausen. This is done by using a lens of the 800xs type and taking a scan of 3×3 images. The evaluation is effected by using the µsoft analysis premium 7.4.8164 evaluation software with the unfiltered surface according to DIN ISO 25178. The Rdq values are ascertained according to DIN ISO 4287.

Preferred composite bodies according to the invention are those that have a Gurley number of 200 to 1700 sec, preferably 250 to 1200 sec and more preferably of 300 to 800 sec, a thickness of 100 to 400 µm, preferably 125 to 200 µm and more preferably of 130 to 170 µm, an average pore size (preferably of the outermost layer) of 60 to 140, preferably 75 to 130 nm, and/or, preferably and, a surface roughness Sdq of less than 10 µm, more preferably of less than 8 µm, particular preference being given to those composite bodies that have each of the most preferred parameters.

In the composite body according to the invention, the substrate is preferably a nonwoven fabric, knit or laid scrim, preferably a nonwoven fabric or laid scrim, more preferably a nonwoven fabric. The fibres preferably have a dimension of 1 to 200 g/km of fibre. The fibres are preferably made of polyacrylonitrile, polyamide, polyester and/or polyolefin, preferably of polyacrylonitrile. The fibres more preferably have a dimension of 10 to 80 g/km of fibre and the fibres most preferably have a dimension of 50 g/km of fibre and are made of polyacrylonitrile, polyamide, polyester and/or polyolefin, preferably of polyester, especially polyethylene terephthalate.

The substrate preferably has a thickness of 50 to 150 µm, preferably 100 to 130 µm. The substrate preferably has a basis weight of 40 to 150 g/m², preferably 50 to 120 g/m², preferably 50 to 100 g/m² and most preferably 60 g/m². The substrate more preferably has a thickness of 50 to 150 µm, preferably of 100 to 130 µm, and a basis weight of 40 to 150 g/m², preferably 50 to 120 g/m², preferably 50 to 100 g/m² and most preferably 60 g/m².

Particularly preferred substrates are those that have all the parameters mentioned, most preferably those that have each of the most preferred of the parameters mentioned.

Especially suitable polymer coatings including polysiloxane are those that have a high intrinsic gas permeability of >200 barrer (cm³ under standard conditions/cm*sec*cmHg) for $CO_2$. Preferred polysiloxanes or silicones are, for example, polydimethylsilicone, polyethylmethylsilicone, nitrile silicone, polytrimethylsilylpropenes or else corresponding copolymers. The polymer coating (PB) preferably has a thickness of 0.05 µm to 10 µm, preferably of 3 µm to 8 µm.

For rapid characterization of the composite bodies with polymer coating, these were described by a simple and reliable measurement of the clean gas selectivities and flow rates. For this purpose, specimens of the membranes having a diameter of 40 mm were introduced into a measurement cell for flat membranes. The membranes were then subjected in a stepwise manner to pressure of the appropriate gas (first methane, then carbon dioxide) on the high-pressure side. The measurement was effected at transmembrane pressures between 2 and 25 bar (2 and $25*10^5$ Pa). Bronkhorst mass flow meters were used to quantify the amounts of gas that permeated.

The data obtained were standardized using the geometric data of the membrane measurement cells and expressed in relative terms. The ratio of the permeated gas volumes of different gases at the same transmembrane pressure is used to calculate the clean gas selectivity. For defect-free membranes, this should be greater than 2.7 for carbon dioxide relative to methane. By appropriate standardization of the individual carbon dioxide flow rates through the membranes, it is readily possible to calculate the average permeability which, for a defect-free polymer coating that is sufficiently thin and has been produced by the process described here, are >500 GPU (always combined with a clean gas selectivity of >2.7).

The composite body according to the invention preferably has a toluene flow rate at 130° C. and transmembrane pressure 30 bar ($30*10^5$ Pa), determined as specified in the examples, of greater than 130 L/m² h, preferably greater than 250 L/m² h, more preferably greater than 300 L/m² h and most preferably greater than 400 L/m² h.

The composite bodies of the invention are notable for good stability under handling. This reduces the probability of occurrence of faults/damage in the composite body that can occur, for example, during introduction into an apparatus for separation of gas mixtures. Typical faults/damage would be fractures in the ceramic owing to kinks or treatment with sharp objects.

The composite bodies of the invention preferably do not have any layer or coating including fluorine-containing polymers.

The composite bodies according to the invention are preferably flexible. In the context of the present invention, "flexible" means that they can be wound without damage around a bar or around a tube having a diameter of down to 15 mm. Particularly preferred composite bodies according to the invention can be wound around a rod or around a bar having a minimal diameter of down to 5 mm without damage. Freedom of the corresponding composite bodies from damage can be demonstrated easily by the determination of the gas flow of nitrogen. In this context, an increase in gas flow determined with nitrogen by more than 100% is considered to be a fault in/damage to the composite body. By virtue of the flexibility of the composite bodies according to the invention, these are introducible in a very simple manner in typical module forms for flat membranes and are especially suitable for use in spiral-wound modules, plates or frame modules, pocket modules and other apparatuses that have been designed for flat membranes.

By virtue of the partially ceramic structure of the composite bodies according to the invention, these also have the advantage that there is preferably little change, preferably none at all, in their thickness and/or porosity under compressive stress. This has the advantage that the entire composite body, even under high compressive stress, permits a virtually constant flow performance in GPU, and the flow is not reduced at higher pressures by a compacting porous structure. To determine the changes in thickness and/or porosity, a circular sample having a diameter of 35 mm can be cut out of a composite body according to the invention and subjected to a pressure of up to 52 bar ($52*10^5$ Pa) in a hydraulic press with simultaneous determination of thickness (measuring instrument from INSTRON). A diagram in which the thickness is plotted as a function of compression pressure can be used, after three cycles of compressive stress and relaxation, to calculate an elastic component of the change in thickness. For composite bodies according to the invention, this is preferably less than 8%, more preferably less than 7%.

The composite bodies according to the invention can be produced in different ways; preferably, the composite bodies according to the invention are obtained by the process according to the invention described hereinafter.

The process according to the invention for production of a composite body, preferably a composite body according to the invention, features the following steps:

(a) applying a coating composition (BM1) to and into a substrate having fibres and interstices between the fibres, where the coating composition is produced by combining (a1) a dispersion (D1) of oxide particles produced by mixing oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 0.5 to 4 μm with water, an inorganic acid, preferably nitric acid, and a dispersing aid, (a2) a dispersion (D2) of oxide particles produced by mixing oxide particles selected from the oxides of the elements Ti, Al, Zr and/or Si, preferably selected from the oxides of the elements Al and Si, and having a median particle diameter ($d_{50}$) of 15 to 150 nm, preferably 40 to 60 nm, with water, (a3) a binder formulation (BF1), produced by mixing at least two organofunctional silanes with an alkanol, preferably ethanol, an inorganic acid, preferably boric acid, and water, (b) consolidating the coating composition (BM1) at a temperature of 100° C. to 275° C., preferably 120 to 240° C., in order to create a first layer (S1'), (c) optionally applying a coating composition (BM2) to at least layer (S1'), where the coating composition (BM2) is produced by combining (c1) a dispersion (D3) of oxide particles produced by mixing oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 0.5 to 4 μm with water, an inorganic acid, preferably nitric acid, and a dispersing aid, (c2) a dispersion (D4) of oxide particles produced by mixing oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 15 to 150 nm, preferably 40 to 60 nm, with water, (c3) a binder formulation (BF2), produced by mixing at least two organofunctional silanes with an alkanol, preferably ethanol, an inorganic acid, preferably boric acid, and water, (d) optionally consolidating the coating composition (BM2) at a temperature of 100° C. to 275° C., preferably 120 to 240° C., in order to create a second layer (S2'), (e) applying a coating composition (BM3) to layer (S1') or, if present, layer (S2'), where the coating composition (BM3) has been produced by combining water and an inorganic acid with an (e1) aqueous dispersion (D5) including oxide particles selected from the oxides of the elements Ti, Al, Zr and/or Si, preferably selected from $Al_2O_3$, $ZrO_2$, $TiO_2$ and $SiO_2$, more preferably selected from the oxides of the elements Al and Si, and having a median particle diameter ($d_{50}$) of 25 to 100 nm, preferably 40 to 60 nm, and with ethanol and with a (e2) binder formulation (BF3) comprising at least two organofunctional silanes, (f) consolidating the coating composition at a temperature of 100° C. to 275° C., preferably 120 to 240° C., in order to create a layer (S3'), (g) optionally applying a coating composition (BM4) to layer (S3'), where the coating composition (BM4) has been produced by combining water and an inorganic acid with an (g1) aqueous dispersion (D6) including oxide particles selected from the oxides of the elements Ti, Al, Zr and/or Si, preferably selected from the oxides of the elements Al and Si, and having a median particle diameter of 15 to 150 nm, preferably 40 to 60 nm, and with ethanol and with a (g2) binder formulation (BF4) comprising at least two organofunctional silanes, (h) optionally consolidating the coating composition at a temperature of 100° C. to 275° C., preferably 120 to 240° C., in order to obtain a layer (S4'), (i) applying a polymer coating containing polysiloxanes to layer (S3') or, if present, to layer (S4')

Polysiloxanes refer to organically modified or unmodified polysiloxanes, which are frequently also referred to as silicones.

The composite bodies according to the invention preferably do not include any step in which a layer or coating including fluorine-containing polymers is applied.

Oxide particles used with very particular preference having a median particle diameter ($d_{50}$) of 15 to 150 nm, preferably 40 to 60 nm, are based on or consist of $SiO_2$. Corresponding particles are available, for example, under the Aerosil® Ox50 name from Evonik Resource Efficiency GmbH.

In the production of the binder formulations BF1 to BF2, preference is given to using sufficient acid that the pH is from 2 to 5. In the production of the coating compositions BM1 to BM4, preference is given to using a sufficient amount of acid that the pH is from 2.5 to 5. If the binder formulation is produced using AMEO, the pH is preferably greater than 8, preferably 8.5 to 9.5. Especially in the case of use of AMEO in the binder formulation, it may be advantageous to combine individual component steps of the production of the binder formulation such that the feedstocks of the binder formulation are metered directly into the coating composition without intermediate steps. But this procedure is also employable for all other coating composition formulations.

Dispersing aids used may be any suitable dispersing aids. Preference is given to using dispersing aids that are sold under the DOLAPIX name by Zschimmer & Schwarz GmbH & Co KG or under the TEGO® Dispers name by Evonik Resource Efficiency GmbH. The dispersing aid used is more preferably a carboxylic acid formulation as sold, for example, under the DOLAPIX CE 64 name by Zschimmer & Schwarz GmbH & Co KG.

It may be advantageous and may therefore be preferable to conduct the optional steps (c) and (d) and (g) and (h) in the process according to the invention since it is possible in this manner to more easily and reliably obtain composite bodies that have a low surface roughness, preferably a surface roughness Sdq, of less than 10 µm, more preferably of less than 8 µm. Particular preference is therefore given to conducting both steps (c) and (d) and steps (g) and (h). In this way, it is also possible to ensure that defects in the composite body, i.e. sites where, for example, there is a distinct deviation in the average pore size, the Gurley number, the thickness and/or the surface roughness from the values claimed or those described as preferred, are avoided.

Organofunctional silanes, preferably alkoxy-functional silanes, more preferably methoxy- and/or ethoxy-functional silanes, that are used are preferably 3-glycidyloxytriethoxysilane, methyltriethoxysilane, octyltriethoxysilane, aminopropyltriethoxysilane and/or tetraethoxysilane. The organofunctional silanes used are preferably 3-glycidyloxytriethoxysilane, methyltriethoxysilane and tetraethoxysilane. In binder formulation (BF1) and/or (BF2), preferably and (BF2), 3-glycidyloxytriethoxysilane, methyltriethoxysilane and tetraethoxysilane are used in a mass ratio of 2 to 4:0.5 to 1.5:1, more preferably of 2.5 to 3.5:0.75 to 1.25:1, most preferably 3:1:1. In binder formulation (BF3) and/or (BF4), preferably and (BF4), 3-glycidyloxytriethoxysilane, methyltriethoxysilane and tetraethoxysilane are used in a mass ratio of 0.5 to 1.5:1.5 to 2.5:1, more preferably of 0.75 to 1.25:1.75 to 2.25:1, most preferably 1:2:1.

It may be advantageous when the coating compositions (BM3) and (BM4) are of identical composition. It may likewise be advantageous when the coating compositions (BM1) and (BM2) are of identical composition. In this way, it is possible to obtain layers (1) or (2) of uniform construction by producing layers (S1') and (S2') or (S3') and (S4'). This can also contribute to avoiding the number of defects in the composite body.

The substrate used in the process according to the invention is preferably a polymer nonwoven including fibres selected from polyacrylonitrile, polyester, polyamide and/or polyolefin, preferably from polyester, more preferably polyethylene terephthalate. Substrates used with preference preferably have the abovementioned parameters, especially the parameters mentioned there as preferred.

The coating compositions can be consolidated, for example, by passage through a hot air oven, an IR oven or another oven. The coating compositions BM1 to BM4 are preferably consolidated at a temperature of 100 to 275° C., more preferably at a temperature of 120 to 240° C.

Alternatively, the polymer coating can be produced, for example, by applying a solution of the silicone polymer, to layer (S3') or, if present, (S4') and/or to the polymer layer. The solution preferably includes 3% to 10% by weight of the polymer. Suitable solvents in the case of utilization of silicones are especially siloxane compounds, preferably hexamethyldisiloxane, but toluene or isooctane are also usable. If silicone is used as polymer, preference is given to utilizing multicomponent systems that can be sourced, for example, from Momentive, Panacol or Evonik Hanse Chemie GmbH. For example, it is possible to use the silicone RTV-615 from Momentive.

A typical formulation of addition-crosslinking silicones from Evonik Hanse Chemie GmbH, consists of solution A and solution B in variable composition, which may be combined in a ratio of 1:10 to 10:1 according to the requirements. Solution A here contains a platinum catalyst (platinum-siloxane complex) and may also contain variable proportions of vinyl-functional polydimethylsiloxane having the desired molecular weight and desired content of vinyl groups, vinyl-functional QM resin in the desired molecular weight and silica particles. Solution B contains SiH-containing polydimethylsiloxane (crosslinker) having the desired molecular weight and desired content of SiH groups, and 0.02% by weight of an inhibitor (e.g. alkynols, divinyltetramethyldisiloxane, methylvinylcyclotetrasiloxane), and may also contain variable proportions of vinyl-functional polydimethylsiloxane having the desired molecular weight and the desired content of vinyl groups, vinyl-functional QM resin in the desired molecular weight and silica particles.

The silicone formulation may also be a moisture-crosslinking silicone system. Polymer formulations of good suitability preferably contain 3% to 7% by weight of crosslinkable silicone in solvents suitable for the respective silicone.

The drying of the coating containing or consisting of polysiloxane, is effected preferably for 1 to 30 minutes at 50 to 150° C.

In the production of the solution of the polysiloxanes, the polymers and the solution concentration, but also the time for mixing of the polymer components in the solvent, are preferably selected such that the mixture penetrates only slightly, and preferably not at all, into the pore structure of the composite body. This can be ascertained by the person skilled in the art by simple preliminary experiments.

It may be advantageous, prior to the respective applying of a polymer coating, to treat the layer/structure to which the coating is to be applied with a plasma, preferably a corona (air plasma). Preference is given here to setting a power of 50 to 900, preferably 100 to 300, W min/m² , in the treatment of the coating including rubber-like polymers, preferably 300 to 900 W min/m² in the treatment of the ceramic layers (i.e. those containing oxide particles). Suitable equipment for corona treatment is available from Softal, Hamburg.

The process for producing the composite bodies according to the invention can be conducted continuously or batchwise. The process is preferably conducted as a roll-to-roll process. Preference is given to conducting all steps (a) to (i) and if appropriate the corresponding sub-steps in such a way that the substrate or the substrate that has been coated once or more than once is unwound from a roll and guided through an apparatus in which one or more steps or sub-steps are conducted and, after the consolidation of the layer(s) applied, the substrate that has been coated once or more than once or the composite body of the invention is rolled up. It may be advantageous when, in the rolling-up of the composite body, an interlayer that prevents sticking of or damage to the layer (S1') or (S4') or any polymer layer present is included in the roll. Polyethylene terephthalate nonwovens, for example, are suitable as interlayer, for example those as also used as substrate. If the process according to the invention is conducted as a roll-to-roll method, the web speed is preferably from 1 to 500 mm/sec., preferably 20 to 50 mm/sec.

By means of the process according to the invention, it is possible to obtain the composite bodies according to the invention. Accordingly, the present invention likewise provides separation apparatuses comprising a composite body according to the invention or composite bodies produced in accordance with the invention.

The composite body according to the invention or a composite body produced in accordance with the invention may be used, for example, in organophilic nanofiltration, preferably as organosilicon nanofiltration membrane, more preferably for separation of organic compounds from organic solvent-containing streams of matter. In this case, preferably 95% of the molecules having a molecular weight greater than 800 g/mol is retained by the membrane and hence separated from the solvent, which preferably has a molecular weight of less than 250 g/mol, preferably less than 150 g/mol and more preferably less than 120 g/mol. Examples of such solvents are, for example, tetrahydrofuran, hexane, heptane, mesitylene, isopropanol, toluene, dichloromethane, acetone and ethyl acetate.

The organic nanofiltration or the separation can be performed at temperatures of greater than 100° C., preferably greater than 120° C. and more preferably greater than 150° C. It may be advantageous when the temperature does not exceed 300° C., preferably 250° C. and most preferably 200° C. More particularly, it is possible through the use of the composite materials according to the invention or composite materials produced in accordance with the invention as membranes, or through use of separation apparatuses according to the invention, to directly treat streams of matter that preferably have temperatures within the ranges mentioned, i.e. of greater than 100° C. to 300° C., preferably of greater than 120° C. to 250° C. and more preferably of greater than 150° C. to 200° C.

BRIEF DESCRIPTION OF THE DRAWINGS

The present invention is elucidated in detail by the figures FIG. 1 to FIG. 4. In FIG. 1, TF means toluene flow rate and, in FIG. 2 and FIG. 3, RH means retention, determined in each case as specified in Example 5. FIG. 4 shows the basic construction of the crossflow filtration apparatus used for determination of toluene flow rate and retention. What is shown is the connection of reservoir vessel VB, membrane cells 1 and 2 (MZ1, MZ2), feed pump FP, permeate pump PP and permeate vessels 1 and 2 (PB1 and PB2).

Figure 1:
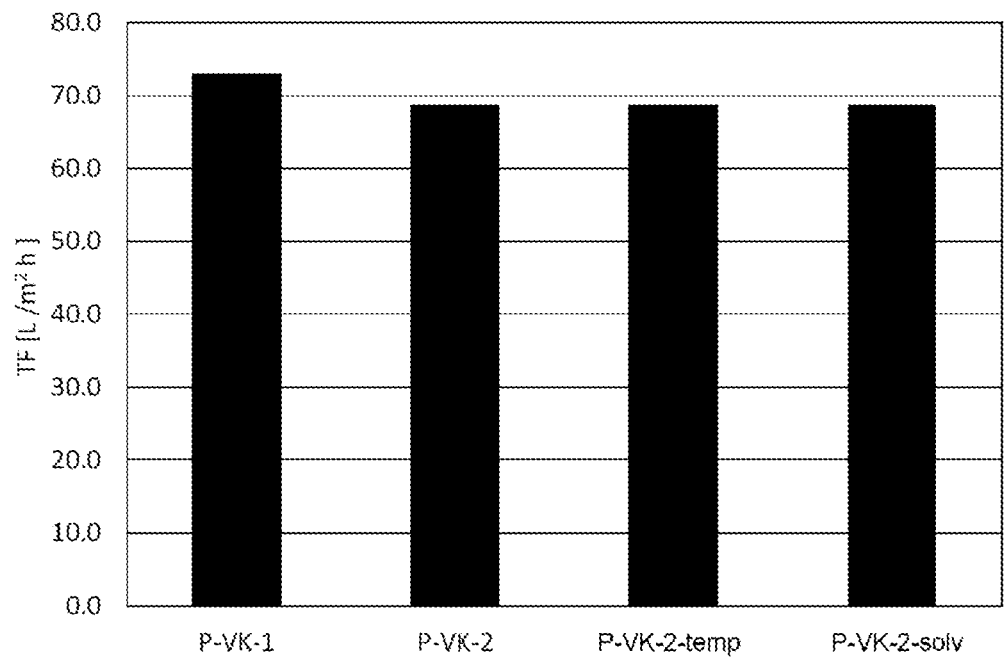
FIGS. 1-3 are graphs.

The present invention is described by the examples which follow, without being limited thereto.

EXAMPLES

TABLE 1a

Raw materials used

| Raw material | Any brand name, manufacturer (abbreviations used in brackets thereafter) |
|---|---|
| Ethanol | |
| Demineralized water | |
| Dispersant | DOLAPIX ® CE 64, Zschimmer & Schwarz GmbH & Co. KG (CE 64) |
| Boric acid | |
| Nitric acid (65% strength by weight) | (HNO₃) |
| 3-Glycidyloxytrimethoxysilane | DYNASYLAN ® GLYMO, Evonik Resource Efficiency GmbH (GLYMO) |
| 3-Glycidyloxytriethoxysilane | DYNASYLAN ® GLYEO, Evonik Resource Efficiency GmbH (GLYEO) |
| Methyltriethoxysilane | DYNASYLAN ® MTES, Evonik Resource Efficiency GmbH (MTES) |
| Tetraethoxysilane | DYNASYLAN ® TEOS, Evonik Resource Efficiency GmbH (TEOS) |
| Aluminium oxide | CT1200 SG, Almatis GmbH D50 = (0.9-1.5) μm * |
| Aluminium oxide | CT 3000 SG, Almatis GmbH D50 = (0.5-0.8) μm * |
| Silicon dioxide | AEROSIL ® Ox 50, Evonik Resource Efficiency GmbH (Ox50) |
| Silicon dioxide | AEROSIL ® 90, Evonik Resource Efficiency GmbH |
| Silicon dioxide | AEROSIL ® 200, Evonik Resource Efficiency GmbH |
| Titanium dioxide | AEROXIDE ® TiO2 P 25, Evonik Resource Efficiency GmbH (P25) |
| Zirconium oxide | 50 nm zirconium oxide, Sigma Aldrich |
| Silica sol | LEVASIL ® CS40-316P, Obermeier GmbH |
| Aluminium oxide | MARTOXID ® MZS-1, Martinswerk GmbH (MZS-1) D50 = (1.5-1.9) μm * |
| Aluminium oxide | MARTOXID ® MZS-3, Martinswerk GmbH (MZS-3) D50 = (2.5-5.0) μm * |
| Aluminium oxide | AEROXIDE ® Alu C, Evonik Resource Efficiency GmbH (Alu C) |
| Resin mixture | Vinyl QM resin mixture VQM 906; Evonik Hanse Chemie GmbH |
| Catalyst | Catalyst 511, Evonik Hanse Chemie GmbH |
| Vinyl-functional polydimethylsiloxane | VS 165 000; Evonik Hanse Chemie GmbH |
| SiH-containing polydimethylsiloxane | Crosslinker 120; Evonik Hanse Chemie GmbH |
| Methyl butynol | Aldrich |
| 2-component polymer silicone | RTV-615 (A + B), Momentive |

* D50: Particle size specified by the manufacturer.

TABLE 1b

Substrate materials used:

| Substrate | Design | Material | Basis weight | Supplier |
|---|---|---|---|---|
| 1 | 05-TH-60W nonwoven fabric | PET | 60 g/sqm | Sojitz, Düsseldorf |
| 2 | Nonwoven fabric | Carbon | 15 g/sqm | Technical Fiber Products, Burnside Mills |
| 3 | Weave | E glass | 60 g/sqm | P&G |
| 4 | Monofilament weave | PET | 40 g/sqm | SEFAR |

Example 1: Production of a Composite Material According to the Invention

Example 1a: Production of Binder Formulation I

A 250 ml beaker was initially charged with 14.22 g of ethanol together with 2.84 g of boric acid, and they were stirred with one another with a magnetic stirrer. As soon as the boric acid had largely dissolved, it was possible to successively add 18.16 g of GLYEO (corresponding to 15.5 g of GLYMO), 5.14 g of TEOS and 5.14 g of MTES. (For varying experimental conditions, this part had to be varied in each case.)

After this was in well-mixed form, an amount of 0.03 g of water was added to start the hydrolysis. The mixture was stirred on a magnetic stirrer for 15 h before a second water content of 7.1 g was added while stirring. The silane binder formulation thus prepared was stirred for a further 5 h until the "pre-hydrolysis" had abated before it was used.

Example 1b: Production of Particle Formulation I 11 kg of water were introduced into a hobbock. 5 kg of Ox50 were added while pivoting. This mixture was stirred slowly for 1 h. In order to further reduce the size of the particles, the mixture was guided through a UIP 1000 ultrasound flow cell in an amount of 12 l/h for a duration of 6 hours. The particle size $d_{50}$ was determined as specified in the description as <60 nm. The solids content was about 30% by mass.

Example 1c: Production of Coating Composition I

A 1000 ml beaker was charged successively with 97 g of water, 0.44 g of Dolapix CE64 and 1.84 g of a 65% strength by mass nitric acid solution, and they were mixed with one another with a magnetic stirrer. 200 g of a finely divided alumina (ct1200SG) were added in portions to this mixture with constant stirring.

Once all components had been weighed in and were in well-mixed form, this dispersion was treated with an ultrasound dispersing finger (Hielscher UP200) in order to destroy any agglomerates present. 42 g of ethanol were added to this dispersion, then this mixture was stirred at least for a further 15 h. After the 15 h had elapsed, either 13.5 g of a 30% OX50 dispersion, prepared according to example 1 b, and 8.74 g of water or 4 g of Aerosil Ox50 together with 18 g of water were added. Subsequently, 52.6 g of a prepared silane binder formulation were added and the overall dispersion was aged again at rest for at least 15 h.

The resulting coating composition has a solids content of 58.7% and can be utilized in this form for coating experiments.

Example 1d: Production of Binder Formulation II

A 250 ml beaker was initially charged with 10.45 g of ethanol together with 0.84 g of boric acid, and they were stirred with one another with a magnetic stirrer. As soon as the boric acid had largely dissolved, it was possible to successively add 5.89 g of GLYEO, 5.0 g of TEOS and 10 g of MTES. (For varying experimental conditions, this part had to be varied in each case.) After this was in well-mixed form, an amount of 0.03 g of water was added to start the hydrolysis. The mixture was stirred on a magnetic stirrer for 1 h before a further 5.19 g of demineralized water were added while stirring. The silane binder formulation II thus prepared was stirred for a further 15 h before it was used.

Example Le: Production of Coating Composition II

A 1000 ml beaker was initially charged with 101.35 g of the Ox50 dispersion from example 1b and then 299.88 g of demineralized water and 3 g of a 65% strength by mass nitric acid solution were added successively, and the mixture was stirred with a magnetic stirrer for 15 hours.

37.39 g of the prepared (silane) binder formulation II and 150.4 g of ethanol were added to this dispersion. Subsequently, this mixture was stirred for a further 2 days.

The resulting coating composition II has a solids content of Ox50 of about 5.7% and can be utilized in this form for the coating experiments.

Example 1f: Coating Process

A strip of the material to be coated (weave, nonwoven fabric or knit) having width 10 cm and length about 1 m was prepared. Alternatively, it is also possible to use the result of a coating operation as described here. In this case, however, it should be ensured that preferably always the same side is processed in subsequent treatment steps.

An automated film drawing apparatus from Zehntner was modified such that it uses a pulley mechanism to pull the web material to be coated vertically upward, at a defined speed of 42 mm/s, out of a dip coating apparatus in which one side of the material web is deflected via a roll and hence does not come into contact with the coating dispersion and the other side of the material web is conveyed through a tank filled with the dispersion.

For coating, the ready-mixed dispersion (coating composition I or II) is introduced into a tank in which there is a rotating roll spanned by the material web. The fill level of the tank was adjusted such that only 45° of the circumference of the roll dips into the solution. For good guiding of the material web, and in order to prevent the dispersion from running along the material web, the web tension was more than 0.1 N/cm of material web width. The material web is guided through the dispersion at a speed of 42 mm/s at room temperature and standard pressure.

On conclusion of the coating, the material web remained suspended vertically at a well-ventilated site for another 30 minutes and only thereafter was it dried and consolidated in a drying cabinet, lying on a grid, at 120° C. for one hour.

Either the dried material web is coated again or the finished composite body can subsequently be cut to size by cutting or punching for the respective test or uses.

For production of the composite material of the invention, coating was effected twice in succession with a coating composition I and twice with a coating composition II. The coating compositions I and II used in any example could be the same or different. To ascertain the most suitable feedstocks (substrate, coating composition, particle formulation, binder formulation etc.), in preliminary experiments, coating was effected as appropriate also only once or more than once with the coating composition I only. The corresponding tables each state the number of coating operations.

The experiments according to Example 1 were conducted analogously using different particle formulations, different coating compositions I and II, different binder mixtures I and II, and different process parameters. Tables 2a to 2l show the raw materials and amounts used, and the process parameters used in each case.

TABLE 2a

Raw materials and amounts used for the production of the binder formulation I (BF-I) and varied process parameters

| BF-I | Ethanol [g] | Boric acid [g] | MTES [g] | TEOS [g] | GLYEO [g] | Water [g] | Total [g] |
|---|---|---|---|---|---|---|---|
| BF-I-a | 14.22 | 2.84 | 5.14 | 5.14 | 18.16 | 0.03 7.1 | 52.6 |
| BF-I-b | 14.22 | 2.84 | 10.28 | 5.14 | 6.01 | 0.03 7.1 | 45.6 |

TABLE 2b

Raw materials and amounts used for the production of the particle formulations (PF) in the respective examples

| PF | Particle type | Water [g] | Dolapix CE64 [g] | HNO3 (65%) [g] | Particles [g] | Ethanol [g] | PF-0 [g] | Water [g] | Total [g] |
|---|---|---|---|---|---|---|---|---|---|
| PF-0 | Ox 50 | 11 000 | | | 5000 | | | | 16 000 |
| PF-I-a | CT 1200 SG | 96.8 | 0.44 | 1.84 | 200 | 41.4 | 13.62 | 8.74 | 362.8 |
| PF-I-b | CT 3000 SG | 96.8 | 0.44 | 1.84 | 200 | 41.4 | 13.62 | 8.74 | 362.8 |
| PF-I-c | MZS-1 | 193.6 | 0.88 | 3.68 | 400 | 82.8 | 27.24 | 17.48 | 725.6 |
| PF-I-d | MZS-3 | 193.6 | 0.88 | 3.68 | 400 | 82.8 | 27.24 | 17.48 | 725.6 |
| PF-I-e | MZS-1 MZS-3 | 193.6 | 0.88 | 3.68 | 200 200 | 82.8 | 27.24 | 17.48 | 725.6 |

TABLE 2c

Raw materials and amounts used for the production of coating composition I (BM-I) in the respective examples

| BM-I | PF-I | Weight of PF-I [g] | BF-I | Weight of BF-I [g] |
|---|---|---|---|---|
| BM-I-a | PF-I-a | 362.8 | BF-I-a | 52.6 |
| BM-I-b | PF-I-a | 362.8 | BF-I-b | 45.6 |
| BM-I-c | PF-I-b | 362.8 | BF-I-a | 52.9 |
| BM-I-d | PF-I-c | 725.6 | BF-I-a | 105.3 |
| BM-I-e | PF-I-d | 725.6 | BF-I-a | 105.3 |
| BM-I-f | PF-I-e | 725.6 | BF-I-a | 105.3 |

TABLE 2d

Raw materials and amounts used for the production of the particle formulations II (PF-II) in the respective examples

| PF-II | Particle type | Water [g] | PF-0 [g] | HNO3 (65%) [g] | Particles [g] | Total [g] |
|---|---|---|---|---|---|---|
| PF-0 | Ox 50 | 11 000 | | | 5000 | 16 000 |
| PF-II-a | Ox 50 | 299.9 | 101.4 | 3 | | 403 |
| PF-II-b | Alu C | 371.2 | | 3 | 30 | 404 |
| PF-II-c | Aerosil 90 | 371.2 | | 3 | 30 | 404 |
| PF-II-d | Aerosil 200 | 371.2 | | 3 | 30 | 404 |
| PF-II-e | P25 | 371.2 | | 3 | 30 | 404 |
| PF-II-f | Zirconium oxide | 371.2 | | 3 | 30 | 404 |
| PF-II-g | Levasil 30 | 301.2 | | 3 | 100 | 404 |

TABLE 2e

Raw materials and amounts and optionally varied parameters used for the production of binder formulation II (BF-II) in the respective examples

| BF-II | Ethanol [g] | Boric acid [g] | MTES [g] | TEOS [g] | GLYEO [g] | Water [g] | Total [g] |
|---|---|---|---|---|---|---|---|
| BF-II-a | 10.45 | 0.84 | 10 | 5 | 5.89 | 5.22 | 37.4 |
| BF-II-b | 2.75 | 0.22 | 1 | 1 | 3.5 | 1.37 | 9.8 |
| BF-II-c | 5.5 | 0.44 | 2 | 2 | 7 | 2.74 | 16.7 |
| BF-II-d | 14.22 | 2.84 | 5.14 | 5.14 | 18.16 | 7.1 | 52.6 |
| BF-II-e | 11 | 0.88 | 4 | 4 | 14 | 5.48 | 39.4 |
| BF-II-f | 8.25 | 0.66 | 3 | 3 | 10.5 | 4.11 | 29.5 |
| BF-II-g | 16.5 | 1.32 | 6 | 6 | 21.1 | 8.22 | 59.1 |
| BF-II-h | 21.98 | 1.76 | 8 | 8 | 28.1 | 10.95 | 78.8 |
| BF-II-i | 10.3 | 0.83 | 8 | 8 | 4.7 | 5.13 | 37.0 |
| BF-II-k | 10.6 | 0.85 | 6.7 | 6.7 | 7.8 | 5.3 | 37.9 |
| BF-II-l | 10.8 | 0.87 | 5 | 5 | 11.7 | 5.4 | 38.8 |
| BF-II-m | 11.0 | 0.89 | 3.3 | 3.3 | 15.6 | 5.5 | 39.6 |
| BF-II-n | 10.4 | 0.84 | 10 | 5 | 5.9 | 5.2 | 37.3 |
| BF-II-o | 10.0 | 0.8 | 6.7 | 6.7 | 6.7 (AMEO) | 5.0 | 35.8 |
| BF-II-p | 10 | 0.8 | 5 (AMEO) | 5 | 10 (IBTEO) | 5.0 | 35.8 |
| BF-II-q | 10 | 0.8 | 12 | 4 | 4.7 | 5.1 | 37.0 |

TABLE 2f

Raw materials and amounts used for the production of coating composition II (BM-II) or coating composition III (BM-III) in the respective examples

| BM-II | PF-II | Weight of PF-II [g] | BF-II | Weight of BF-II [g] | Weight of ethanol [g] |
|---|---|---|---|---|---|
| BM-II-a | PF-II-a | 404 | BF-II-a | 37.4 | 150 |
| BM-II-b | PF-II-a | 404 | BF-II-b | 9.8 | 150 |
| BM-II-c | PF-II-a | 404 | BF-II-c | 16.7 | 150 |
| BM-II-d | PF-II-a | 404 | BF-II-n | 37.3 | 150 |
| BM-II-e | PF-II-a | 404 | BF-II-e | 39.4 | 150 |
| BM-II-f | PF-II-a | 404 | BF-II-f | 29.5 | 150 |
| BM-II-g | PF-II-a | 404 | BF-II-g | 59.1 | 150 |
| BM-II-h | PF-II-a | 404 | BF-II-h | 78.8 | 150 |
| BM-II-i | PF-II-e | 404 | BF-II-e | 39.4 | 150 |
| BM-II-k | PF-II-f | 404 | BF-II-e | 39.4 | 150 |
| BM-II-l | PF-II-g | 404 | BF-II-e | 39.4 | 150 |
| BM-II-m | PF-II-a | 404 | BF-II-i | 39.4 | 150 |
| BM-II-n | PF-II-a | 404 | BF-II-k | 37.9 | 150 |
| BM-II-o | PF-II-a | 404 | BF-II-l | 38.8 | 150 |
| BM-II-p | PF-II-a | 404 | BF-II-m | 39.6 | 150 |
| BM-II-q | PF-II-b | 404 | BF-II-n | 37.3 | 150 |
| BM-II-r | PF-II-a | 404 | BF-II-i | 37.0 | 150 |
| BM-II-s | PF-II-a | 404 | BF-II-k | 37.9 | 150 |
| BM-II-t | PF-II-b | 404 | BF-II-e | 39.4 | 150 |
| BM-II-u | PF-II-c | 404 | BF-II-e | 39.4 | 150 |
| BM-II-v | PF-II-d | 404 | BF-II-e | 39.4 | 150 |
| BM-II-w | PF-II-a | 404 | BF-II-q | 37.0 | 150 |
| BM-II-x | PF-II-a | 404 | BF-II-n | 37.3 | 150 |
| BM-III-a | PF-II-a | 404 | BF-II-o | 35.0 | 150 |
| BM-III-b | PF-II-a | 404 | BF-II-p | 35.0 | 150 |

TABLE 2g

Experiments to test the suitability of substrates

| Composite body | Substrate | BM | Application operations |
|---|---|---|---|
| A | 1 | BM-I-a | 2 |
| B | 2 | BM-I-a | 2 |
| C | 3 | BM-I-a | 2 |
| D | 4 | BM-I-a | 2 |

TABLE 2h

Experiments to test the suitability of coating compositions I

| Composite body | Support | BM | Application operations |
|---|---|---|---|
| E | 1 | BM-I-a | 2 |
| F | 1 | BM-I-b | 2 |
| G | 1 | BM-I-c | 2 |
| H | 1 | BM-I-d | 2 |
| I | 1 | BM-I-e | 2 |
| J | 1 | BM-I-f | 2 |

TABLE 2i

Experiments to fix the ratio of binder to particles in coating composition II

| Composite body | Support | BM | Application operations |
|---|---|---|---|
| K | Composite body A | BM-II-b | 2 |
| L | Composite body A | BM-II-c | 2 |
| N | Composite body A | BM-II-e | 2 |
| O | Composite body A | BM-II-f | 2 |
| P | Composite body A | BM-II-g | 2 |
| Q | Composite body A | BM-II-h | 2 |

TABLE 2j

Experiments to fix the particles to be used in coating composition II

| Composite body | Support | BM | Application operations |
|---|---|---|---|
| R | Composite body A | BM-II-e | 2 |
| S | Composite body A | BM-II-t | 2 |
| T | Composite body A | BM-II-u | 2 |
| U | Composite body A | BM-II-v | 2 |
| V | Composite body A | BM-II-i | 2 |
| W | Composite body A | BM-II-k | 2 |
| X | Composite body A | BM-II-l | 2 |

TABLE 2k

Experiments to fix the binder formulation to be used in coating composition II

| Composite body | Support | BM | Application operations |
|---|---|---|---|
| 2A | Composite body A | BM-II-e | 2 |
| 2B | Composite body A | BM-II-m | 2 |
| 2C | Composite body A | BM-II-n | 2 |
| 2D | Composite body A | BM-II-o | 2 |
| 2E | Composite body A | BM-II-p | 2 |
| 2F | Composite body A | BM-II-q | 2 |
| 2G | Composite body A | BM-II-w | 2 |
| 2H | Composite body A | BM-II-x | 2 |

TABLE 2l

Experiments to fix the binder formulation to be used in coating composition II (one-pot method)

| Composite body | Support | BM | Application operations |
|---|---|---|---|
| 2I | Composite body A | BM-III-a | 2 |
| 2K | Composite body A | BM-III-b | 2 |

Example 2: Characterization of the Composite Bodies

The composite bodies produced in the examples were characterized as described hereinafter. The results are compiled in Table 3.

The roughnesses Rdq min., Rdq max. and SDQ were determined as described in detail above.

Composite Bodies a to D:

All composite bodies have individual regions that show low roughness (Rdq min) and regions with higher roughness (Rdq max). Therefore, these values are not sufficiently authoritative to be utilized in making a decision with regard to the optimal substrate.

It is possible to directly infer from the images taken within the scope of measurement of the roughness values that the composite body D, which is based on monofilament weave, regularly has varying heights and depths for structure-related reasons with a high total thickness. Therefore, this material was subjected to further assessment since a smooth surface cannot be achieved therewith.

Glass fibre weaves (substrate C) would be of very good suitability owing to their low roughness since the RDq min and Rdq max values are the smallest compared with the composite bodies A to D, but the ceramic layers on the glass fibre weaves have a tendency to crack since the filaments, particularly the interstices between the individual fibres of the filaments, are poorly impregnated by the coating composition.

"Wet-laid" nonwovens (substrate A and B) and also papers feature quite smooth structures (without protruding fibres) and are therefore of good suitability as substrate. However, when thick individual fibres are used, close attention should be paid to the interstices between the fibres, since these must be very substantially filled (closed). Particularly suitable substrates are therefore PET nonwoven and carbon fibre nonwoven. On account of the smoother coating (RDq and SDQ are smaller), the PET nonwoven is preferred for the further studies.

Spunbonded nonwovens and meltblown nonwovens are of poor suitability, as are dry-laid needlefelts, which were used only in preliminary tests. Moreover, it is often necessary to choose a multilayer construction since an individual coating on its own does not give a sufficiently smooth surface. The first layer serves in particular to fill the fibre interstices. Thereafter, the layers must become smoother.

Composite Bodies E to J:

A double coating with the variously sized particles shows that the range of use of the various particles. ct1200SG (composite bodies E) and MZS1 (composite bodies H) are the most suitable for achieving good ceramic filling of the substrate interstices, apparent from the low Gurley numbers. Finer and also larger particles lead to poorer filling of the fibre interstices (ct 3000 SG—composite body G or MZS3—composite body I).

A particle mixture of MZS1 and MZS3 gives relatively good surface qualities (cf. in this regard the Rdq min/max and SDQ values), but this is combined with a larger average pore radius (MFP).

Since a material having pores of size less than 100 nm is sought as the resulting composite bodies, in which the fiber interstices of the substrates are filled to a good level, further work thereafter was conducted with ct1200SG (composite body A or E) in particular (although MZS1—composite body H would be just as suitable). In summary, it can be stated that particles having a d50 of the particle size distribution of 0.5 to 5.0 µm can be processed.

Composite Bodies K to Q:

On application of further layers of fine Ox50 particles to the ct1200SG surface, the average pore size is reduced and the surface quality is improved. Variations in the composition of particle content relative to silane binder content were conducted.

Through the variation in the silane binder contents, it is not possible to show any clear tendencies with regard to the surface quality established in the coatings. The highest binder content at which relatively small pores (MFP) can still be achieved was used in many of the further examples in order to ensure good binding of the particles.

Composite Bodies R to X:

On comparison of the various particles used, it is firstly noticeable that silane binders with silicon dioxide particles (composite bodies R, T, U) result in quite good smooth surfaces. Owing to the particle structure, however, Aerosil 90 (composite body T) and Aerosil 200 (composite body U) are not very suitable owing to the aggregated primary particles, just like the aluminium oxide Alu C (composite body S). Aerosil Ox 50 (composite body R), being matched to the pores of the substructure to be coated, has the most suitable particles (particle size). Moreover, Aerosil Ox 50 gives the smallest pores (MFP=0.11 µm).

Titanium dioxide P25 (composite body V) is stabilizable in the dispersion only to a limited degree with the binder system under the conditions chosen, and therefore forms very poor surfaces. Zirconium oxide from Roth (composite body W) is of virtually just as good suitability as Aerosil Ox50. Levasil (composite body X) has very small, very well-stabilized $SiO_2$ particles, but these are so small that they infiltrate the pores of the substructure (ct 1200SG). Therefore, there is barely any difference in the surface quality of this sample from that of the ct1200SG surface (composite body E).

Composite Bodies 2A to 2H:

It was found that comparatively hydrophilic silane mixtures having a relatively high proportion of TEOS and GLYEO (composite bodies 2A; 2D and 2C) result in coatings that are just as smooth as composite bodies having comparatively hydrophobic silane mixtures, having a relatively high proportion of MTES (composite bodies 2G and 2H). Only composite bodies that have been produced with a distinctly elevated proportion of the crosslinking TEOS component, such as composite bodies 2B and 2C (TEOS proportion greater than 25% (m/m)) show poorer surface qualities.

The results seem to be essentially independent of the particle system chosen. This means that, when using different particles, the trends are the same with regard to the different silane compositions, not the absolute results.

Contact angle not measurable (nm) appears in Table 3 when the surface is so hydrophilic that a water droplet is sucked in.

Composite Bodies 2I and 2K:

The production of mixtures with aminosilanes is not possible in the form described. In order to be able to prepare the samples, the silane mixture has to be introduced without pre-hydrolysis into the vessel in which the particle dispersion is already being stirred and hydrolysed therein (one-pot method). Otherwise, the pre-hydrolysate would solidify, i.e. form a gel.

Observing this change in the process, exchange of the adhesion-promoting component GLYEO for AMEO is possible in principle. More particularly, it is readily possible in this way (and by virtue of the altered pH established) to use other particle systems, for example P25.

Various alkylsilanes (IBTEO), by contrast with MTES, lead to an enhanced tendency to form agglomerate. This then leads to very uneven surfaces.

TABLE 3

Results of the characterization of the composite bodies produced in the examples and in the comparative example

| Composite body | Rdq min. | Rdq max. | SD Q | Contact angle | Basis weight | Thickness | Tensile strength, machine direction | Tensile direction, cross | MFP | Gurley number |
|---|---|---|---|---|---|---|---|---|---|---|
| A | 5.5 | 52.5 | 18.9 | 88 | 215 | 118 | >50 | 37 | 0.27 | 340 |
| B | 7.1 | 42.4 | 34.7 | 73 | 163 | 120 | 49.1 | 20 | 0.31 | 110 |
| C | 5.1 | 9.0 | 10.5 | 80 | 211 | 125 | >50 | >50 | — | 290 |
| D | 7.2 | 17.2 | 18.0 | 82 | 307 | 256 | >50 | 40 | 0.38 | 580 |
| E | 7.8 | 58.6 | 21 | 125 | 230 | 157 | >50 | 40 | 0.32 | 190 |
| F | 3.9 | 66.0 | 45.2 | 54 | 279 | 172 | >50 | 43 | 3.7 | 1100 |
| G | 6.6 | 10.8 | 12.9 | 84 | 238 | 141 | 47 | 36 | 0.38 | 340 |

TABLE 3-continued

Results of the characterization of the composite bodies produced in the examples and in the comparative example

| Composite body | Rdq min. | Rdq max. | SD Q | Contact angle | Basis weight | Thickness | Tensile strength, machine direction | Tensile direction, cross | MFP | Gurley number |
|---|---|---|---|---|---|---|---|---|---|---|
| H | 12.4 | 32.4 | 28.2 | 7 | 254 | 225 | 48 | 36 | 0.77 | 110 |
| I | 9.6 | 16.8 | 18.4 | nm | 285 | 174 | 49 | 34 | 0.45 | 250 |
| J | 3.5 | 8.7 | 8.0 | nm | 208 | 146 | 47 | 43 | 0.18 | 1010 |
| K | 3.6 | 6.9 | 7.8 | nm | 218 | 142 | 43 | 43 | 0.11 | 900 |
| L | 5.2 | 9.5 | 11.0 | 8.17 | 245 | 138 | >50 | 37 | 0.11 | 500 |
| N | 5.4 | 16.0 | 11.0 | 8.02 | 206 | 147 | >50 | 36 | 0.11 | 550 |
| O | 4.2 | 9.8 | 8.4 | 75.74 | 206 | 139 | >50 | 38 | 0.12 | 440 |
| P | 3.3 | 5.4 | 6.5 | nm | 205 | 135 | >50 | 40 | 0.12 | 550 |
| Q | 3.7 | 15.0 | 9.7 | 40.1 | 209 | 142 | >50 | 33 | 0.13 | 720 |
| R | 3.4 | 8.5 | 7.5 | nm | 209 | 144 | >50 | 30 | 0.11 | 740 |
| S | 12.0 | 52.0 | 40.0 | 35.55 | 211 | 148 | >50 | 39 | 0.26 | 400 |
| T | 13.0 | 59.0 | 57.0 | 26.21 | 209 | 147 | >50 | 32 | 0.26 | 470 |
| U | 5.3 | 21.0 | 15.0 | 15.43 | 209 | 141 | >50 | 37 | 0.22 | 520 |
| V | 67.0 | 79.0 | 82.0 | nm | 210 | 154 | >50 | 33 | 0.30 | 640 |
| W | 5.7 | 15.0 | 13.0 | 11.48 | 208 | 140 | >50 | 26 | 0.12 | 540 |
| X | 5.8 | 45.0 | 16.0 | 20.35 | 206 | 136 | >50 | 38 | 0.29 | 1600 |
| 2A | 3.4 | 8.5 | 7.5 | nm | 209 | 144 | >50 | 30 | 0.11 | 740 |
| 2G | 5.6 | 22.0 | 14.0 | 74.7 | 209 | 153 | 50 | 46 | 0.14 | 560 |
| 2H | 5.2 | 9.5 | 11.0 | 79.99 | 243 | 138 | 48 | 30 | 0.12 | 440 |
| 2B | 6.1 | 31. | 18.0 | 52.09 | 223 | 167 | >50 | 42 | 0.10 | 750 |
| 2C | 6.6 | 12.0 | 17.0 | nm | 227 | 170 | >50 | 31 | 0.20 | 750 |
| 2D | 4.5 | 12.0 | 12.0 | nm | 251 | 146 | 49 | 34 | 0.12 | 710 |
| 2H | 4.5 | 12.0 | 13.0 | 63.44 | 196 | 128 | >50 | 28 | 0.087 | 710 |
| 2E | 3.7 | 15.0 | 11.0 | nm | 242 | 141 | >50 | 31 | 0.12 | 610 |
| 2F | 12.0 | 52.0 | 40.0 | 120.13 | 249 | 155 | >50 | 36 | 0.26 | 460 |
| 2I | 5.4 | 8.4 | 7.8 | 43.17 | 206 | 145 | 49 | 40 | 0.11 | 470 |
| 2K | 6.0 | 13.9 | 10.7 | 106.8 | 209 | 148 | >50 | 32 | 0.10 | 550 | nm = not measurable

Example 3: Continuous Process for Producing a Composite Body

To produce a composite body according to the invention (analogously to A) in a continuous coating process in a corresponding manufacturing system as manufactured, for example, by Matthis, consisting of a support unwinder, a coating unit, a dryer and a winder with tension control, coating composition BM-I-a was produced in a batch size 125 times greater in a stirred 70 l stainless steel vessel as described above. This was then coated by the dip-coating method with retention of a tension of >1 N/cm of material web width on a polyester nonwoven support (05-TH-60W nonwoven fabric) having a width of about 30 cm and length up to 500 metres, in the course of which the support was also impregnated. This was introduced into an air circulation oven of length 5 m about 50 cm downstream of the dip-coater, in which the composite material was dried at 140° C. The material web speed was 1.5 m/min.

After the material web had been dried, it was wound up at the given tension and then treated for a second time in another coating operation with retention of all process parameters. The resulting composite body K-VK-1 (analogously to composite body A) is described by the parameters specified in Table 4.

a) Hydrophilic Composite Body

This composite body K-VK-1 was subsequently coated twice with a coating composition BM-II-e produced on a scale enlarged by about 10-fold in the same system operated with the same machine parameters. The resulting continuously produced composite body K-VK-2 (analogously to composite body R) is described by the parameters specified in Table 4.

b) Hydrophobic Composite Body

Composite body K-VK-1 was subsequently coated twice with a coating composition BM-II-x produced on a scale enlarged by about 10-fold in the same system operated with the same machine parameters. The resulting continuously produced composite body K-VK-3 (analogously to composite body 2H) is described by the parameters specified in Table 4.

TABLE 4

Parameters for the composite bodies produced in Example 3

| Composite body | Rdq min. | Rdq max. | SD Q | Contact angle | Basis weight | Thickness | Tensile strength Machine direction | Tensile strength Cross | MFP [μm] | Gurley number |
|---|---|---|---|---|---|---|---|---|---|---|
| K-VK-1 | 6.7 | 19.3 | 14.3 | 85 | 185 | 138 | >50 | 34 | 0.25 | 350 |
| K-VK-2 | 4.5 | 13.5 | 11.6 | 24 | 212 | 144 | >50 | 30 | 0.11 | 740 |
| K-VK-3 | 3.3 | 5.4 | 6.5 | 89 | 197 | 141 | >50 | 38 | 0.09 | 800 |

Example 4: Composite Bodies with a Polysiloxane-Containing Polymer Layer a) Production of a Polymer Solution (PL-1)

10 g of component A (RTV-615A) in 90 g of hexamethyldisiloxane were initially charged in a round-bottom flask and heated to 60° C. On attainment of the given temperature, 1 g of component B (RTV-615B) in 10 g of hexamethyldisiloxane was added. The components, which mix very well under these conditions, after a stirring time of 2 h, were left to cool and, after dilution with hexamethyldisiloxane to a content of 92% by weight of hexamethyldisiloxane in the solution, the viscosity was checked. This was 13 mPas at first and varied with time and rose continuously. This solution was processed and the composite body was coated as soon as the viscosity was in the range from 5 to 50 mPas. Viscosities were determined with a rotary viscometer from Malvern Instruments Limited, Worcestershire, UK, model: Kinexus KNX2112m at a shear rate of 100 s$^{-1}$ and a temperature of 25° C. The pot life of the ideal processing window is about 2 hours.

b) Production of a Polymer Solution (PL-2)

The solution was obtained by combining solution A and solution B in a (weight) ratio of 1:1. Solution A contained 99.8% by weight of the vinyldimethylpolysiloxane/vinyl-QM resin mixture VQM 906 and 0.2% by weight of catalyst 511. Solution B contained 52.99% by weight of the vinyl-functional polydimethylsiloxane VS 165.000, 38.99% by weight of the SiH-containing polydimethylsiloxane crosslinker 120, 8% by weight of the vinyldimethylpolysiloxane/vinyl-QM resin mixture VQM 906, and 0.02% by weight of the inhibitor methylbutynol. This mixture was diluted with hexamethyldisiloxane directly prior to use, such that the solution used had a hexamethyldisiloxane content of 85% by weight and a viscosity of 9 mPas. The latter was determined with a rotary viscometer from Malvern Instruments Limited, Worcestershire, UK, model: Kinexus KNX2112m at a shear rate of 100 s$^{-1}$ and a temperature of 25° C.

c) Production of a Polymer Solution (PL-3)

10 g of component A (RTV-615A) in 90 g of hexamethyldisiloxane were initially charged in a round-bottom flask and heated to 60° C. On attainment of the given temperature, 1 g of component B (RTV-615B) in 10 g of hexamethyldisiloxane was added. The components, which mix very well under these conditions, after a stirring time of 2 h, were left to cool and, after dilution to a content of 95% by weight of hexamethyldisiloxane in the solution, the viscosity was checked. This was 6 mPas at first and varied with time and rose continuously. This solution was processed and the composite body was coated as soon as the viscosity was in the range from 5 to 50 mPas. The latter was determined with a rotary viscometer from Malvern Instruments Limited, Worcestershire, UK, model: Kinexus KNX2112m at a shear rate of 100 s$^{-1}$ and a temperature of 25° C. The pot life of the ideal processing window is about 2 hours.

d) Production of a Polymer Solution (PL-4)

A solution produced as in a) was diluted with hexamethyldisiloxane to 95% by weight rather than to 92% by weight of hexamethyldisiloxane. After homogenization for 2 hours, this was used for the coating.

e) Coating of a Composite Body with Polymers

A composite body was predried in a drying cabinet at 100° C. for at least 2 h, then coated by the dip-coating method, as already described in Example 1f. For this purpose, an automated film drawing apparatus from Zehntner was modified such that it uses a pulley mechanism to pull the web material to be coated vertically upward, at a defined speed of 42 mm/s, out of a dip coating apparatus in which one side of the material web is deflected via a roll and hence does not come into contact with the coating solution and the other side of the material web is conveyed through a tank filled with the solution.

For coating, the ready-mixed solution was introduced into a tank in which there was a rotating roll spanned by the material web. The fill level of the tank was adjusted such that only 45° of its circumference of the roll dips into the solution. For good guiding of the material web, and in order to prevent the solution from running along the material web, the web tension was about 0.1 N/cm of material web width. The material web was guided through the solution at a speed of 42 mm/s at room temperature and standard pressure. After the coating had concluded, the material web remained suspended at room temperature in the apparatus for another 15 minutes in order that the solvent could largely evaporate.

Only after drying of the material web at 120° C. overnight in a drying cabinet was it characterized. A correlation of the composite bodies and coating solutions used can be found in Table 6.

Some of the various composite materials, rather than being predried at 100° C., were treated with a corona. For this purpose, the composite body was secured with its front side upward on an electrically nonconductive material, PET nonwoven, from Sojitz, 05-TH-60W, and conveyed through a corona treatment system (from Softal, Hamburg) at a speed of 1.5 m/min. The power of the corona treatment can be variably adjusted. The experimental setting can likewise be found in Table 6.

All composite bodies were characterized by determination (executed as specified above) of the clean gas selectivity for $CO_2/CH_4$ and the flow rate of $CO_2$ in order to provide evidence of faultless coating with the polymer solution. The results are presented in Table 6.

TABLE 6

Experimental parameters and results from Example 4e.

| Resulting composite body | Composite body used | Solution utilized | Corona power [W min/m] | Clean gas selectivity $CO_2/CH_4$ | $CO_2$ flow rate [GPU] |
|---|---|---|---|---|---|
| P-VK-1 | K-VK-3 | PL-1 | 600 | 3 | 730 |
| P-VK-2 | K-VK-3 | PL-2 | 600 | 3 | 820 |
| P-VK-3 | K-VK-3 | PL-3 | 600 | 3 | 940 |

The composite bodies P-VK-1 to P-VK-3 feature quite a good tolerance to the handling of the composite bodies. This reduces the probability of occurrence of faults in or damage to the composite body that can occur during introduction into an apparatus for separation of solvents. Typical faults or damage would be fractures in the ceramic owing to kinks or treatment with sharp objects.

All composite bodies P-VK-1 to P-VK-3 are flexible and can be wound without damage around a bar or around a tube having a diameter of down to 15 mm. The composite bodies P-VK-1 to P-VK-3 can be wound onto minimal diameters of down to 5 mm without damage. The freedom of the corresponding composite bodies from damage can be demonstrated easily by the determination of the clean gas selectivity, which is the same before and after the treatment. In this case, a reduction in the clean gas selectivity by 2 units is assessed as "defect in the composite body".

By virtue of the flexibility of the composite bodies, these are introducible in a very simple manner in typical module forms for flat membranes and are especially suitable for use in spiral-wound modules, plates and frame modules, pocket modules and other apparatuses that have been designed for flat membranes.

Figure 4:
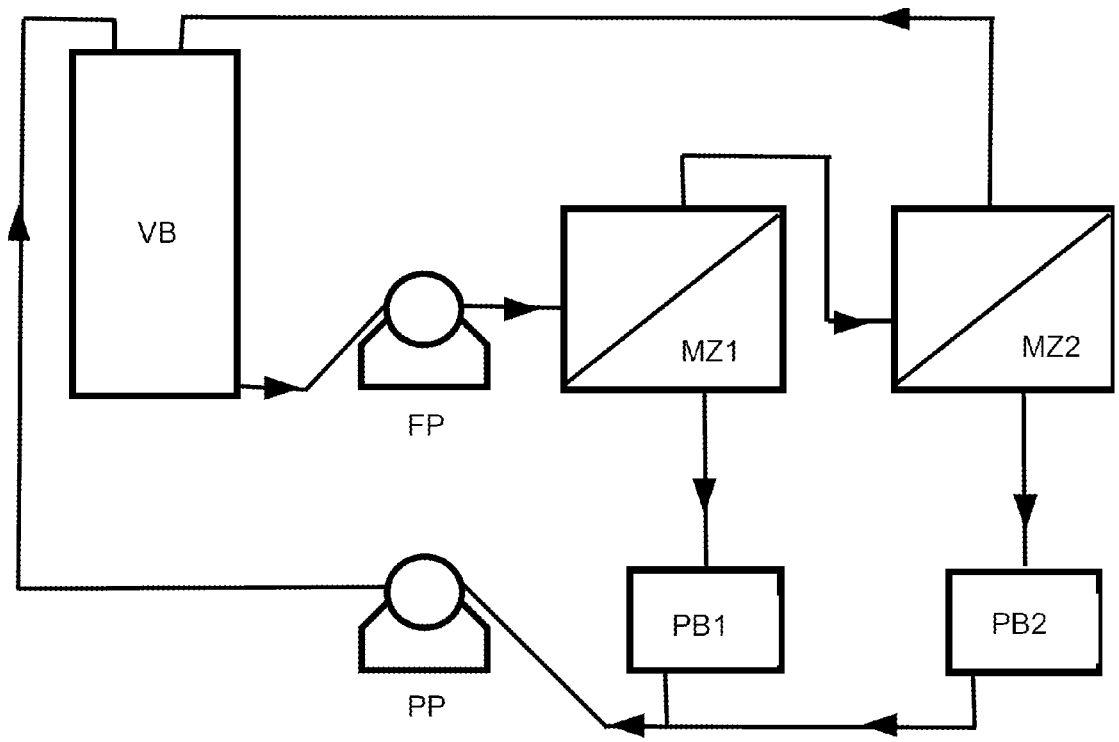
FIG. 4 is a schematic representation of a crossflow filtration apparatus

Example 5: Testing of the Composite Bodies with a Polysiloxane-Containing Polymer Layer For further characterization, some of the membranes were examined by what is called the MWCO (molecular weight cutoff) method in toluene. This method is described inter alia in WO 2011/067054 A1, but also in Journal of Membrane Science 291 (2007) 120-125. For this purpose, the membranes were tested in a crossflow filtration with toluene as solvent, in which polystyrenes of different molecular weight are dissolved in a total concentration of 1 g/L. The basic construction of this apparatus is shown in FIG. 4. The permeate flows (toluene) were monitored and quantified gravimetrically over a period of 3 hours. After three hours, a portion of the permeate collected last was taken and collected in a separate sample bottle for the determination of molecular weight, which was made by means of an HPLC system.

Unless stated otherwise, testing was effected in the crossflow filtration apparatus at transmembrane pressure (TMP) 30 bar ($30*10^5$ Pa) and at a temperature of 30° C., with continuous pumping of the permeate stream by means of a pump back into the reservoir vessel. The membrane cells that were utilized in these experiments had been sourced from Evonik Membrane Extraction Technologies.

Table 7 gives, as results of this testing, the molecular weights at which 90% retention is achieved. Some of the membranes tested were subjected to pretreatments (Examples 5a and 5b). The results of these tests are shown below and in FIGS. 1 to 3 and Table 7.

a) Thermal Stability

Some of the composite bodies obtained in Example 4e were stored at 150° C. in a drying cabinet for 72 hours (composite bodies: P-VK-1-temp). Thereafter, the characterizations of the membrane properties were repeated. There were no significant changes either in flow rate or retention compared to the thermally untreated composite bodies.

b) Solvent Stability

The composite bodies obtained in Example 4e were stored in mesitylene at 150° C. for 72 hours (composite bodies: P-VK-1-solv). Thereafter, the characterizations of the membrane properties were repeated. There were no significant changes either in flow rate or retention compared to the results of the untreated composite bodies.

c) Separation Properties at Elevated Temperature

The composite bodies obtained in Example 4e were used at transmembrane pressure 30 bar ($30*10^5$ Pa) at elevated temperature. There was a distinct change here in the flow rate and only a slight change in the retention. The results of the measurements are shown hereinafter, with examination of specimen P-VK-1-130° C. at a temperature of 130° C. for the permeation characteristics for toluene and the retention for polystyrene, and the specimen P-VK-1-30° C. are the comparative values for a specimen that was examined at 30° C. The examinations were always effected over a period of three hours and at a permeate pressure of 5 bar ($5*10^5$ Pa), recording the flow rate after three hours. The results of the progression of the retentions can be found in FIG. 3. The results of the determination of the toluene flow rate and of the retention can be found in Table 7.

TABLE 7

Resuls for determination of toluene flow rate and of retention

| Composite body | MWCO (90%) | Flow rate [L/m² h] at TMP 30 * 10⁵ Pa | Temperature |
|---|---|---|---|
| P-VK-1 | about 500 | 72 | 30 |
| P-VK-1 | about 625 | 312 | 130 |
| P-VK-3 | about 650 | 410 | 130 |

Figure 2:
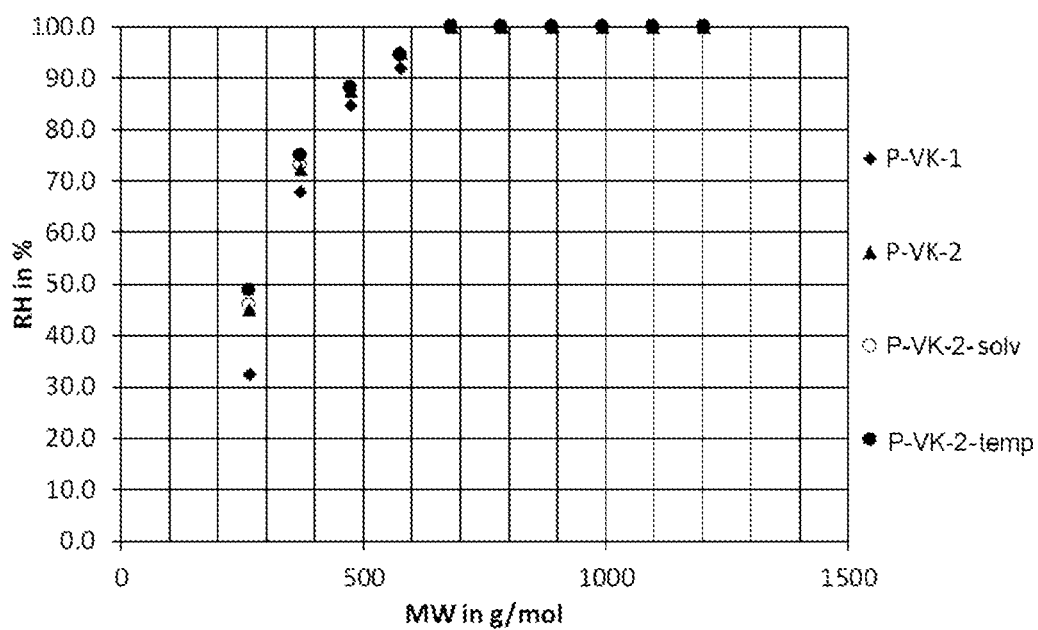
Figure 3:
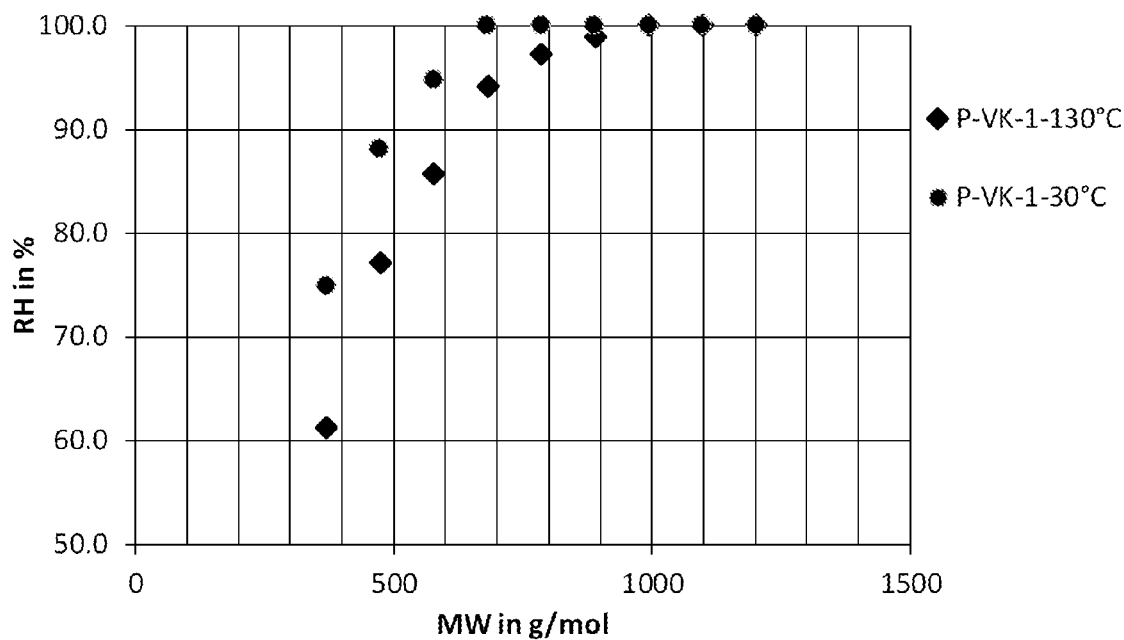

The results of FIGS. 1 to 3 and Table 7 show that, by virtue of the ceramic structure of the composite bodies P-VK-1 to P-VK-3, the thickness and porosity thereof is virtually unchanged under compressive stress at elevated temperature. This is crucial for the entire composite body according to the invention, even under high compressive stress at elevated temperature, to have a virtually constant toluene flow rate, and for the flow not to be reduced at higher pressures by a compacting porous structure.

Example 6: Examination of the Change in Particle Size Distribution in Different Processing Stages In addition, a study was conducted as to the extent to which particle size distribution changes in the course of production of the coating composition. For this purpose, the particle formulations (PF) used in the preceding examples were analysed with regard to their average particle size (d50). The measurement results are shown in Table 8a. Then coating compositions (BM) were produced as described in the preceding examples. The average particle size of the coating compositions was measured. The measurement results are shown in Table 8b. Table 8c records the d50 values of the particles used according to the manufacturer.

A quantitative assessment of the measurements is given in Table 9.

In summary, it can be inferred from the results set out in Tables 8a, 8b, 8c and 9 that the differences in particle size in the different processing stages (PF to BM) result exclusively from the degree of stabilization of the particles in the respective dispersion.

TABLE 8a

Measurements of average particle size of particle formulation (PF)

| Measurement No. | Reference of particle formulation (PF) | d50 [μm] PF measured |
|---|---|---|
| 1 | PF-I-a | 1.6 |
| 2 | PF-I-b | 0.9 |
| 3 | PF-I-d | 4.5 |
| 4 | PF-II-0 | 0.12 |
| 5 | PF-II-a | 0.18 |
| 6 | PF-II-c | 0.26 |
| 7 | PF-II-d | 32.5 |

TABLE 8b

Measurements of average particle size of coating composition (BF)

| Measurement No. | Reference of coating composition (BM) | d50 [μm] BM measured | Comment |
|---|---|---|---|
| 1 | BM-I-a | 1.7 | |
| 2 | BM-I-c | 1.4 | |
| 3 | BM-I-e | 4.3 | |
| 4 | | | |

TABLE 8b-continued

Measurements of average particle size of coating composition (BF)

| Measurement No. | Reference of coating composition (BM) | d50 [µm] BM measured | Comment |
|---|---|---|---|
| 5 | BM-II-d | 0.18 | Only addition of HNO3 changes the average particle size |
| 6 | new | 0.28 | |
| 7 | new | 32.5 | |

TABLE 8c

Average particle size according to manufacturer

| Measurement No. | Particle type | d50 [µm] according to manufacturer |
|---|---|---|
| 1 | ct 1200 SG | 0.9-1.5 |
| 2 | ct 3000 SG | 0.5-0.8 |
| 3 | MZS 3 | 2.5-5.0 |
| 4 | Ox50 | 0.1 derived from SEM |
| 5 | Ox 50 | 0.1 derived from SEM |
| 6 | Aerosil 90 | 0.08 derived from SEM |
| 7 | Aerosil 200 | Primary grain (sintered together) 0.005 |

TABLE 9

Evaluation of measurement results

| Measurement No. | Evaluation |
|---|---|
| 1 | Average particle size increases to a minimal degree more as a result of addition of the binder formulation and is always above the manufacturer's figure, which is probably because of the manner of dispersion. |
| 2 | Average particle size increases as a result of addition of the binder formulation and is always above the manufacturer's figure, which is probably because of the manner of dispersion. |
| 3 | Average particle size smaller after addition of binder, but still within the manufacture's figure. Better dispersion and hence fewer agglomerates. |
| 4 | Pure dispersion of the particles with high ultrasound intensity for dispersion. |
| 5 | Solely dilution of the particle dispersion from 4 and adjustment of the pH results in a greater average particle size. Addition of the binder formulation does not result in any change in the measured average particle size. |
| 6 | Addition of the binder formulation results in a slight change in the measured average particle size. |
| 7 | Addition of the binder formulation results in a slight change in the measured average particle size. Particle size should not be equated with primary grain size, which varies widely from the value measured. |

The invention claimed is:

1. A method comprising:
separating organic compounds from organic solvent-containing streams of matter in an organophilic nanofiltration process,
wherein said organophilic nanofiltration process comprises a composite body or a separation unit containing the composite body wherein said composite body comprises:
a porous substrate,
a first porous layer comprising oxide particles bonded to one another and also partly bonded to the porous substrate, wherein the oxide particles of the first porous layer comprises at least one of $Al_2O_3$, $ZrO_2$ and $SiO_2$, wherein the first porous layer is positioned on the porous substrate and in interstices of the porous substrate which include fibers of an electrically nonconductive material;
a second porous layer positioned on at least on one side of the porous substrate, said second porous layer comprising oxide particles bonded to one another and partly bonded to the first porous layer, wherein the oxide particles of said second porous layer include at least one of $Al_2O_3$, $ZrO_2$ and $SiO_2$,
wherein the oxide particles present in the first porous layer have a greater median particle size than the oxide particles present in the second porous layer, and
wherein the median particle size (d50) of the oxide particles in the first porous layer, is from 0.5 to 4 µm and the median particle size (d50) of the oxide particles in the second porous layer is from 0.015 to 0.15 um,
wherein a polymer coating (PB) comprising one or more polysiloxanes is provide atop or above the second porous layer;
wherein the porous substrate is a nonwoven fabric, knit or laid scrim,
wherein said composite body can be wound around a cylinder having a diameter of 15 mm without being damaged, and
wherein a flexible composite body is suitable as an organophile nanofiltration membrane.

2. The method of to claim 1, wherein the separation is performed at temperatures of greater than 100° C.

3. The method of claim 1, wherein the composite body has a toluene flow rate at 130° C. and transmembrane pressure 30 bar ($30*10^5$ Pa), of greater than 130 L/m²h.

4. The method of claim 1, wherein the composite body has a thickness of 100 to 400 µm.

5. The method of claim 1, wherein the fibres fibers have a dimension of 1 to 200 g/km of fiber and comprise polyacrylonitrile, polyamide, polyester and/or polyolefin.

6. The method of claim 1, wherein the substrate has a thickness of 50 to 150 µm, and a basis weight of 40 to 150 g/m².

7. The method of claim 1, wherein the composite body has an average pore size of 60 to 140, and wherein the average pore size is determined by means of gas flow porometry.

8. The method of claim 1, wherein the composite body, on a surface of a layer (2), has a surface roughness Sdq of less than 10 µm.

9. The method of claim 1, wherein the flexible composite body is suitable for separation of organic compounds from organic solvent-containing streams of matter.

10. The method of claim 1, wherein the organic compounds which are separated from organic solvent-containing streams have a molecular weight higher than 800 g/mol.

11. The method of claim 1, wherein the organic solvent has a molecular weight less than 250 g/mol.

12. The method of claim 1, wherein the organic solvent is tetrahydrofuran, hexane, heptane, mesitylene, isopropanol, toluene, dichloromethane, acetone or ethyl acetate.

* * * * *